United States Patent [19]

Timmenga

[11] Patent Number: 5,702,499
[45] Date of Patent: Dec. 30, 1997

[54] WASTE CONVERSION BY LIQUID THERMOPHILIC AEROBIC DIGESTION

[75] Inventor: Hubert J. Timmenga, Vancouver, Canada

[73] Assignee: Sim Associates, Vancouver, Canada

[21] Appl. No.: 329,735

[22] Filed: Oct. 26, 1994

Related U.S. Application Data

[63] Continuation-in-part of Ser. No. 181,916, Jan. 18, 1994, abandoned.

[51] Int. Cl.$^6$ .................... C05F 9/04; C05F 11/08
[52] U.S. Cl. .................... 71/9; 71/6; 71/7
[58] Field of Search .................... 71/7, 9, 11, 6; 510/475, 441

[56] References Cited

U.S. PATENT DOCUMENTS

| | | | |
|---|---|---|---|
| 3,462,275 | 8/1969 | Bellamy | 99/9 |
| 3,711,392 | 1/1973 | Metzger | 210/11 |
| 3,864,247 | 2/1975 | Fuchs | 210/12 |
| 3,989,499 | 11/1976 | Jetzer | 71/9 |
| 4,132,638 | 1/1979 | Carlsson | 210/7 |
| 4,276,174 | 6/1981 | Breider et al. | 210/613 |
| 4,292,328 | 9/1981 | Coulthard et al. | 426/2 |
| 4,512,103 | 4/1985 | Coulthard et al. | 47/1.1 |
| 4,795,711 | 1/1989 | Nockemann | 435/316 |
| 5,019,267 | 5/1991 | Eberhard et al. | 210/606 |

FOREIGN PATENT DOCUMENTS

| | | |
|---|---|---|
| 0 026 938 | 7/1980 | European Pat. Off. . |
| 0 040 147 | 8/1981 | European Pat. Off. . |
| 2 318 116 | 7/1976 | France . |
| 0226476 | 11/1985 | Japan .................... 71/9 |
| 1 151 140 | 7/1997 | Switzerland . |
| 8806148 | 8/1988 | WIPO .................... 71/9 |

*Primary Examiner*—Ferris Lander
*Attorney, Agent, or Firm*—Townsend and Townsend and Crew LLP

[57] ABSTRACT

A batch process for the conversion of organic solid waste material containing cellulose and lignin through liquid thermophilic aerobic digestion comprises comminuting the organic solid waste material, adjusting the moisture content of the comminuted material to at least 90% parts by weight of water, mixing the comminuted material with a thermophilic aerobic micro-organism, adjusting the pH of the mixture to 5.5–7.5 and supplying heat and oxygen to the mixture to effect thermophilic aerobic digestion of the mixture. The thermophilic aerobic digestion of the mixture is terminated after the mixture has stabilized as a low nitrogen material but prior to digestion of the cellulose and lignin in the mixture, and the stabilized mixture is separated into solid and liquid fractions. The process includes the monitoring of parameters for determining the termination of digestion.

11 Claims, 4 Drawing Sheets

WASTE CONVERSION BY LIQUID THERMOPHILIC AEROBIC DIGESTION

This is a continuation-in-part of application Ser. No. 08/181,916, filed Jan. 18, 1994 now, abandoned.

BACKGROUND OF THE INVENTION

1. Field of the Invention

The present invention relates to processes for the conversion of organic solid waste material by liquid thermophilic aerobic digestion and is useful in particular, but not exclusively, for the treatment, for example, of fruit and vegetable components, grass clippings and other succulent materials and of fibre from the pulp and paper industry.

2. Description of the Related Art

Large quantities of unstable organic waste are produced in the urban areas of North America and other densely populated regions.

Non-stabilized organic wastes are difficult to handle, cannot be stored for long periods and degrade to produce odours and contaminated leachate. Processing of these materials normally takes a long time, if it is attempted at all.

Organic waste is most commonly disposed of in sanitary landfills or processed in dry composting facilities. With the limited availability of landfill or dry composting space near urban centres and the public resistance to new landfills, waste generators are searching for alternative solutions. The processing of organic waste to make fertilizer or other useful products is one solution that can be established close to or in urban areas.

Several technologies exist for the stabilisation of solid organic waste. These technologies include regular or dry composting, anaerobic digestion and aerobic thermophilic digestion.

Regular or dry composting, where moist organic material is aerobically processed, is likely one of the oldest methods of stabilisation of organic waste and animal manures. Many modifications of the base technology are available. Technologies vary from the composting of small piles, of large windrows actively turned with a windrow turner, to the use of actively aerated facilities where air is blown through the composting mass. Wet materials such as biosolids and vegetable matter need to be "bulked" with dry materials such as wood chips before composting. Through application of technology and process regulation, the processing time varies from one year or more for a passive pile to about twenty-one days for a mechanically mixed and aerated facility. After an active phase, compost needs to be stabilised for up to twelve weeks using passive curing techniques.

Anaerobic digestion, where organic materials are biologically stabilised under anaerobic conditions, is a process that is frequently used for dilute mixtures. The process is most suitable for the processing of large quantities of liquid suspensions with a consistent quality. The process requires a fairly long processing time of up to twenty days.

For the stabilisation of smaller quantities of organic materials or where the processing time is critical or where the incoming stream is varied or where the material is very wet or in liquid form, a third process, i.e. thermophilic aerobic digestion, is better suited to handle the organic matter than either dry composting or anaerobic digestion. The thermophilic aerobic digestion technology has been used for some time to stabilize sewage sludge and reduce its volume, with several installations operating in North America.

The stabilisation of organic solid waste using thermophilic aerobic digestion has been described in U.S. Pat. No. 3,462,275, issued Jan. 31, 1968 to W. D. Bellamy, which describes a process for thermophilic aerobic composting with the use of external heating.

U.S. Pat. No. 3,864,247, issued to Hubert K. E. Fuchs, describes a reaction vessel for aerobic thermophilic composting, but does not refer to the use of external heat.

U.S. Pat. No. 4,292,328, issued Sept. 29, 1981 to T. Lionel Coulthard et. al., improves upon the above-identified U.S. Pat. No. 3,462,275 by teaching that external heating is not required.

However, both of the above-mentioned U.S. Pat. Nos. 3,864,247 and 4,292,328 teach the use of relatively long digestion times of up to seven days, and both teach single cell protein as a final product for use as animal feed or for industrial use.

U.S. Pat. Nos. 4,132,638, issued Jan. 2, 1979 to Carl-Goren H. Carlsson, and 5,019,267, issued to Eberhard et al., both teach the use of enzyme additions to a thermophilic aerobic process for processing sewage sludge.

U.S. Pat. No. 4,276,174, issued Jun. 30, 1981 to Edmund J. Breider et at., teaches a process where the supply of oxygen-containing gas is regulated according to sensed temperatures in the reaction vessel.

BRIEF SUMMARY OF THE PRESENT INVENTION

It is an object of the present invention to provide a novel and improved process for the production of fertilizer or animal feed, by thermophilic aerobic digestion which substantially reduces the time required for digestion, as compared to the above-discussed prior an processes, by interrupting the digestion process prior to the reduction of cellulose and lignin in the material being processed.

According to the present invention, there is provided a batch process for the production of fertilizer and animal feed from organic solid waste material comprising the steps of comminuting a batch the organic solid waste material, adjusting the moisture content of the comminuted material to at least 90% parts by weight of water, mixing the comminuted material with a thermophilic aerobic microorganism, adjusting the pH of the mixture to 5.5–7.5, supplying heat and oxygen to the mixture to effect thermophilic aerobic digestion of the mixture, and terminating the thermophilic aerobic digestion of the mixture prior to complete digestion of the mixture.

More particularly, by surveillance certain parameters of the mixture, an "end point" can be determined. At this time the lignin materials start to be degraded, i.e. at this time the mixture has stabilized. It has been found that suitable parameters to be tested for this purpose include the pH level, the phosphate content, the sulphate content and the carbon-to-nitrogen ratio of this mixture.

In this way, the point in the process where the least amount of soluble organic material and nutrients is available in the mixture to be processed can be detected. This "end point" varies greatly with the quality of the material processed and must be identified for each batch. The present invention therefore follows the principle of batch processing.

The mixture is thus tested so as to detect the stabilization of soluble organic and inorganic products, and then the digestion is terminated, so as to exclude them from the liquid fraction for recovery e.g. as "low nitrogen" fertilizer or animal feed. This is different from the stated or implied object of the above-mentioned prior patents, which was to produce a protein with a high nitrogen content after a thorough digestion to remove carbon from the mixture being processed to concentrate nitrogen, which is inaccessible in the organic matter, in the microorganisms performing the digestion. This produces a microbial biomass which is then removed from the system as a high protein material. Processing a waste into a protein source would remove organic fibre from the product and would take a significantly longer processing time. Until now, no effort was made to effect surveillance of and control the aerobic thermophilic digestion process for the determination of the length of the process needed to stabilize the mixture.

Preferably, all elements in the process and the configuration of those elements are designed to minimize effluent generation. Effluent streams include solid waste, gases and water. Each of these streams can be discharged without further treatment.

BRIEF DESCRIPTION OF THE DRAWING

Further features, advantages and objects of the present invention will be more readily apparent from the following description of a process according to the present invention, when taken in conjunction with the accompanying drawings, in which.

DESCRIPTION OF THE PREFERRED EMBODIMENT

Figure 1:
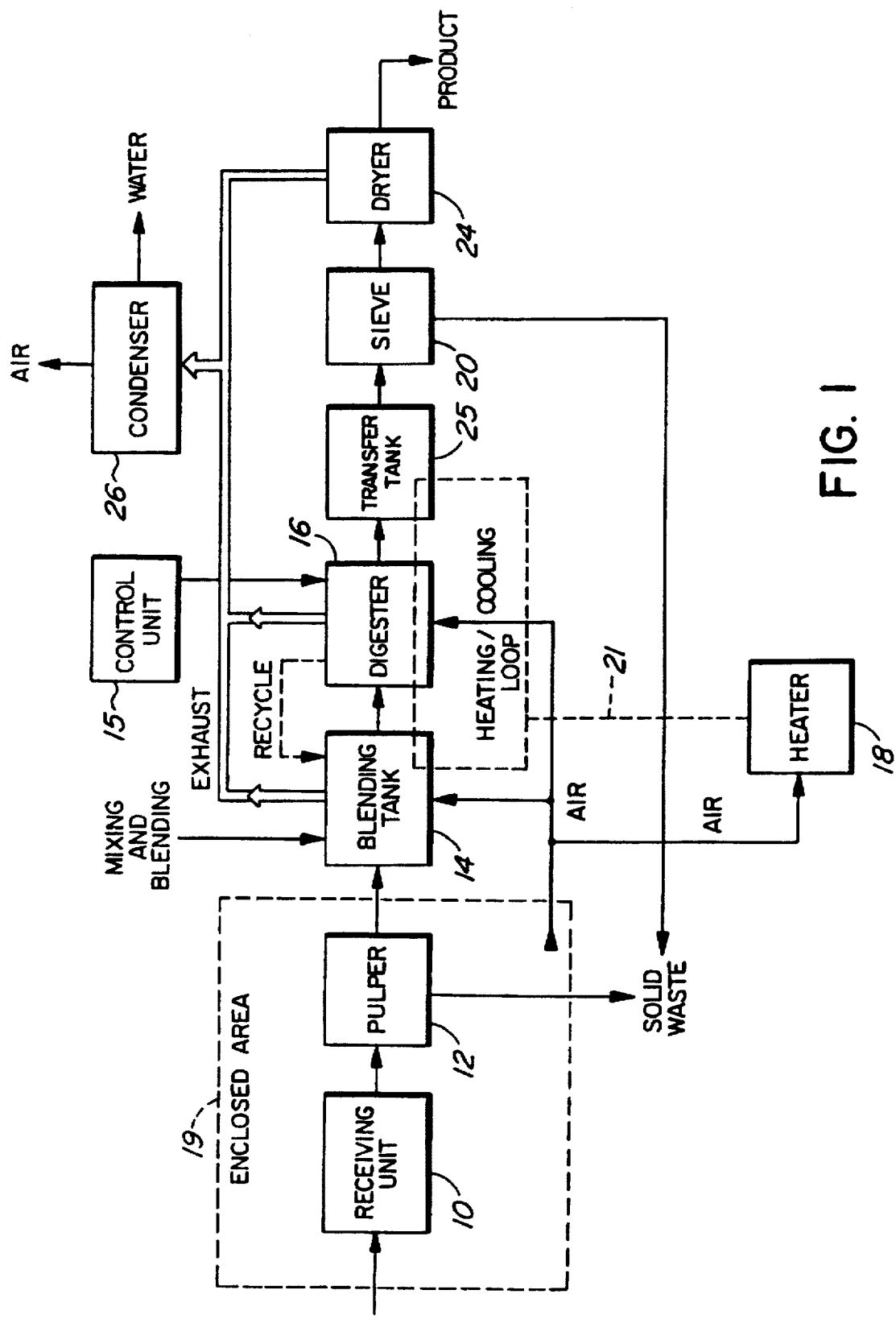
FIG. 1 shows a block diagram of a process and apparatus according to the present invention for producing fertilizer.

In the process illustrated in the accompanying drawing, an organic waste material, for example fruit and vegetable matter, is received at a receiver unit 10 and is then reduced in size and liquified in a pulper 12 to provide a liquified material having a moisture content of approximately 90% by weight. Process water recycled from a subsequent stage in the process is used for the dilution of the liquified material, if necessary. A pulper is one appropriate equipment for separating fibres in plant materials, but any other suitable comminuter may be employed in the present invention.

The receiver unit 10 comprises a tipping floor (not shown), a sorting facility (not shown) for the removal of large objects and recyclables from the incoming materials, and conveyors (not shown) for moving the sorted materials to the pulper 12.

To facilitate subsequent rapid stabilization of the material, the carbon-to-nitrogen ratio is then adjusted in a blending tank 14. The required carbon-to-nitrogen ratio of the resultant mixture depends on the requirements of the end product and is determined for each batch processed. In the blending tank, the liquified mixture is corrected to a specified value by mixing in materials with different carbon-to-nitrogen ratios. The carbon-to-nitrogen ratio is established by measuring the total carbon content and the total nitrogen content of the organic waste material received at the receiving unit 10 and by measuring the carbon-to-nitrogen ratio in filtered samples of both the mixture and the liquified materials making up the mixture. The latter method estimates the "available carbon-to-nitrogen ratio". The measurement is effected by an automatic carbon/nitrogen analyzer or manually, employing appropriate wet chemistry techniques. A computer program, which also indicates the mixing ratios of different materials available to the operator for adding to the blending tank 14, is employed for calculating the required carbon-to-nitrogen ratio. The materials which may be employed for adjusting this ratio include manure, fruit processing sludge, cotton seed meal, soy bean meal, canola bean meal, animal and fish waste, sewage sludge, grass clippings and seaweed, paper fibre, straw, etc.

The bacterial population facilitating the stabilisation of the organic waste is sensitive to the pH of the mixture. The pH is detected by a pH probe (not shown) and is adjusted to within the range of pH 5.5–7.5 for correct operation of the digesting/stabilisation process, a lime slurry being added to the blending tank 14 as necessary to raise the pH.

The adjustment of the pH and the carbon-to-nitrogen ratio through the mixing of materials facilitate the production of a stable, pure product with low variability, thus minimizing the need for blending of the end product.

Heat is supplied to the blending tank 14 by a heating/heat recovery system as described in greater detail below. The heated/aerated mixture from the blending tank 14 is transferred to a digester 16, where stabilization of the organic compounds takes place and sufficient heat is then supplied to the digester 16 to maintain the temperature of the mixture at approximately 60° C. The mixture is vigorously agitated in the digester 16 by a mechanical stirrer (not shown) and oxygen containing gas (air) is introduced into the mixture through a pipe 17 at a rate sufficient to keep the dissolved oxygen level at or above 1.0 mg/l. Alternatively, mixing and aeration may be effected by pumping the mixture through a Venturi device designed to inject air into the pumped mixture. The air is supplied at a rate of less than 4 cubic metres per cubic metre of the mixture per hour and is obtained from an enclosed area 19 containing the receiving unit 10 and the pulper 12, so that building air is used as oxygen-containing gas, thus providing air pollution control because all volatile organic compounds in the building air, originating from the receiving unit 10 and the pulper 12, are then stabilized in the digester 16. Little odour is generated from the digester 16. The digester operates on the batch principle, which means that the slurry only leaves the digester when it has stabilized. At that time, the digester is emptied into a transfer tank 25.

The oxygen supply is controlled through regulating the airflow to the blending tank 14 and the digester 16, in each of which the oxygen level is measured by a dissolved oxygen probe (not shown) connected to a computerized process control unit 15 which controls the air flow into the digester 16 and the blending tank 14 so as to increase or decrease the flow of air in order to maintain the mixture in the digester 16 and the blending tank 14 in an aerobic condition.

When the system is started, the thermophilic microorganisms required for digestion may be introduced into the system by adding compost or other material which has previously been employed in a thermophilic process to the blending tank 14. Subsequently, the microorganisms are recycled from the digester 16 to the blending tank 14 to maintain the process.

The thermophilic process in the digester 16 is an exothermic process. While the heat released in the process is not sufficient to raise the temperature of the dilute mixture, it is sufficient to keep the temperature in the desired range. Some surplus heat for heating the blending tank 14 may be available from the digester 16 and from a transfer tank 25.

The transfer tank 25 is located after the digester 16 and serves to collect the stabilized mixture before the mixture is transferred to a screen unit 20.

Heating and cooling of the contents of the blending tank 14, the digester 16 and the transfer tank are employed to carefully control the stabilisation process in the digester 16. The digester 16, the blending tank 14 and the transfer tank 25 each comprise a vertical metal tank surrounded by a heating/cooling jacket (not shown) and insulation (not shown). Heating and cooling are effected through the use of a heat conserving system 21 which comprises a heater 18 and which employs a heat transfer liquid, for example glycol or other suitable liquid. The heat transfer liquid in the system is kept at a minimum of 63° C. by means of the heater 18. If heating is required, the heat is supplied by the heat transfer liquid in heating jackets on the blending tank 14, the digester 16 and the transfer tank 25. If cooling is required to lower the temperature to the set temperature, the heat transfer liquid is employed to absorb heat from the digester 16 and the transfer tank 25 and is then used to heat the blending tank 14.

The endpoint of the biological stabilisation reaction is detected to control the process effectively. More particularly, in the stabilisation process, dissolved organic carbon and nutrients are removed from the liquid phase by the active bacterial biomass. The reaction controlled by measuring at least one of and preferably two or more of, the pH value, the phosphate content, the sulphate content and the carbon-to-nitrogen ratio of the mixture to determine when this stabilization has been sufficiently achieved. Then, and before digestion of the more stable components in the mixture takes place, the reaction is terminated by discontinuing heating and agitation and by reducing the oxygen supply. The mixture is immediately discharged to the transfer tank 25, where some heat is extracted by the heat transfer unit, and is fed through a screening unit 20 to a dryer 24. All oversize and contaminant material removed is disposed of as solid waste to an approved disposal facility.

The screened product is dried to a water content of less than 10% by weight. This is accomplished with the use of a totally enclosed dryer as the dryer 24, discharging only water vapour to a condenser 26, ready for reuse or discharge.

The solid waste stream is reduced through rigid quality control of received materials and recycling. Loads of incoming organic waste material are preferably received only from approved sources and preferably consist of only source separated materials. In this manner the sorting out of non-digestible wastes is minimized. All materials are sorted on a tipping floor at the receiving unit 10 and recyclables are removed for recycling. Non-usable, non-recyclable materials are discarded.

The process generates a substantial amount of process water. To allow this water to be discharged in an environmentally safe and economical way, the water should not contain contaminants such as organic matter or nutrients. The process does not contain a press, centrifuge or similar device that would create a liquid effluent containing high levels of nutrients and organic matter. Therefore, the mixture from the digesters is dried in a commercially available dryer, i.e. the dryer 24, which is capable of handling slurry with a high water content. This dryer emits only water vapour which does not contain nutrients or organic matter or any other contaminants. The water vapour is condensed in condenser 26. The condensed water from the condenser 26 is virtually contaminant free and can be discharged without treatment. Part of the condensed water is used for process water and cleaning. All other liquid effluent streams generated in the process are directed into the main process stream for stabilisation and processing. If a thickener is used, e.g. for economic reasons, then the process will require water treatment of the liquid stream from the thickener before it can be discharged.

Large quantities of air are used in the process in order to supply oxygen to the bacteria which stabilize the organic waste. The process is designed to use all odour containing air as process air. Once processed, odour causing substances are removed and air used in the process can be discharged to the atmosphere without causing nuisance or contamination.

Building air from the enclosed receiving unit 10 and pulper 12 is used for the air supply to the heater 18 and the digester 14. This potentially odorous air is stripped of all odour producing compounds in the biological process in the digester 14. The off-gases of the blending tank 14 and the digester 16 are then routed to the condenser 26 to extract water for subsequent use in adjusting the moisture level in the blending tank 14. Dry air from the condenser 26 is then routed to a biofilter or a chemical odour scrubber (not shown) or is incinerated in the steam boiler (not shown) to remove any remaining odour causing component.

Since the end product of the present process is used as a fertilizer or animal feed, it is necessary only to stabilize and pasteurize the incoming material. Therefore, complete digestion or breakdown of cellulose and lignin material, as taught by the above-identified prior patents, is not required for the end product of the present process. Consequently, the duration of the treatment of the material in the digester is comparatively brief, i.e. about 1–2 days instead of 5–7 days.

The end product of the process according to the present invention may be used as a fertilizer or fertilizer base-product in the production of field crops and horticultural crops or as an animal feed component. Residuals are of a quality which is acceptable for discharge. The present process is designed to reduce solid waste discards, contamination of effluent and air emissions and to reuse heat.

EXAMPLE

A pilot trial of the process according to the present invention was used to process a batch of approximately 1000 L of vegetable waste material comprising primarily of leafy vegetables and thereby to investigate general parameters of the process such as temperature consistency, $CO_2$ production and viscosity, and the specific parameters needed to determine the reaction end point. The trial was also used to confirm that the biological activity was influenced reversibly by the pH level in the reaction mixture.

This waste material was ground to pass a ⅛ inch screen with an industrial-scale food grinder. The waste material, which was reduced to a volume of approximately 360 L through the grinding action, was then transferred to a heated reaction vessel with a volume of 600 L. The mass was diluted with warm tap water to facilitate agitation with a top mounted agitator at 270 rpm, and air was supplied through spargers in the bottom of the tank. Air was supplied with a maximum of 40 SCFH (18.6 L/min.), giving a v/v*hour ratio of 2. Both apparent air volume and pressure were recorded to calculate standard volumes of air. Compost from an active composting windrow was used to introduce thermophilic microorganisms. The pH was adjusted through additions of agricultural (quick) lime and was kept above 5.5.

The mixture in the tank was monitored for dissolved oxygen (DO), pH, and temperature, and the height of the liquid in the vessel was recorded on a regular basis to estimate evaporation. Samples were taken every 4 to 6 hours during the course of an experimental run. Samples were filtered (0.45 μm) and analyzed for Biological Oxygen Demand ($BOD_5$), nutrient content (nitrate, nitrite, ammonium, phosphorus and sulphate), total solids, total dissolved solids, viscosity, and particle size.

The correct temperature is important to thermophilic organisms. Therefore, the operating temperature for the process was selected as 60° C. The warm-up time of the mixture was short through the use of dilution water of about 60° C. The temperature rose to 60° C. in 5.5 hours before the thermostat started regulating the energy flow to the reaction vessel's heater.

The energy use in the vessel was recorded by using a chart recorder on the leads of the heater unit. The chart showed that the heater operated at 40-45% of its capacity after the vessel's content reached 60° C.

Evaporation was estimated by recording fluid levels in the tank. Fluid levels were affected by sampling and corrections were made in volume calculations both for sampling and for water added during the test. The fluid level dropped from 80 cm to 71 cm in 38 hours. With an addition of 20 L, this indicates evaporation of 67 L or 1.76 L/hour for a vessel with a fluid surface of 0.518 $m^2$. Evaporation reflected 16.1% of the initial volume.

The solids content in the reaction vessel represents the "strength" or "consistency" of the mixture. The ground vegetable mixture had a solids content of 7.88%. To improve oxygen transfer, solids were diluted to about 5%. After dilution, the consistency was 5.14%. Due to evaporation of water, the level of solids in the mixture increased to 5.6%.

The actual amount of solids in the vessel decreased by approximately 1000 grams over 38 hours based on calculations which included consistency and volume. Assuming that this loss of solids is due to assimilation and production of $CO_2$, the loss of mass represents the production of 1866 L or 3.68 kg of $CO_2$ during 38 hours of the test. Losses due to sampling were negligible because after filtration of each sample, solids were returned to the vessel. $CO_2$ production represented 0.12 L/L*hour of initial volume.

The apparent viscosity of the mixture is an important parameter affecting oxygen transfer and energy requirements for agitation. Oxygen transfer is affected because in fluids with a high apparent viscosity, small bubbles formed by an air injection system tend to coalesce to make large bubbles, resulting in a decreased oxygen transfer rate from the air in the bubbles to the mixture. The apparent viscosity changed with the duration of the digestion, temperature and force of rotation during measurement, and varied between 12,000 cp in fresh materials and 200 cp after digestion.

To manage the process and to determine the endpoint of the digestion reaction, data was collected in the reaction vessel and from samples taken from the liquid during the trial run. Process time is an important factor for both plant economics and product quality. An under-stabilized product would become active when wetted and would produce foul odours, while an over-digested product would not contain fibrous material. All organic matter would then be hydrolysed, causing difficulties in drying of the product.

Real time measurements and analyses of samples were used to establish the endpoint. The real time measurements included Dissolved Oxygen (D.O.), pH, temperature and height of mixture. Laboratory analyses include nitrate, ammonium nitrogen, nitrite, phosphate, BOD and sulphate. Also, the quality of the endproduct was affected by the process time.

Dissolved Oxygen (D.O.) levels in the reaction vessel are important for the maintenance of microorganisms which perform the digestion-stabilization reaction. Generally, D.O. levels should be kept above 0.5 mg/L. Measured D.O. levels in the top of the obtainable range levels in a mixture may indicate low biological activity as caused by low or high temperatures or a pH level outside the optimal range.

Figure 2:
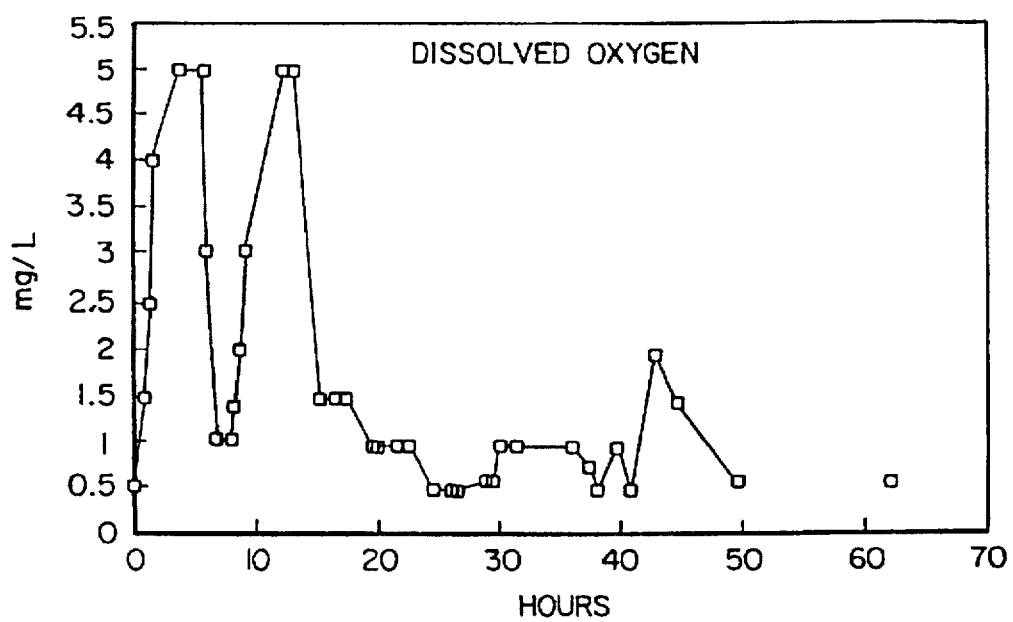
FIG. 2 through 7 show graphs illustrating the variation of the D.O., pH, nitrate content, ammonia content, phosphate content and sulphate content, respectively, of a mixture undergoing the process according to the present invention.

FIG. 2 shows a graph illustrating the variation of the D.O. during the process. As can be seen, the D.O. levels reached a high level shortly after start-up. This indicates that the thermophilic reaction was not performing optimally, probably due to low temperature in the mixture. The D.O. decreased to levels around 1 mg/L after 6 hours, after the temperature had reached 60° C., indicating vigorous biological activity. To test the effect of a low pH on the D.O. levels, no lime was added until the D.O. increased to pre-activity levels. This happened at about 9 hours. Addition of a generous amount of lime increased biological activity, resulting in a low D.O. at 12 hours. This experiment confirmed that a pH level below 5.5 negatively affected the bacterial activity.

The pH level of the mixture is influenced by the available oxygen levels. Under anoxic conditions, microorganisms responsible for digestion may switch to anaerobic respiration and produce organic acids, thus decreasing the pH. When the reaction slows, after the endpoint has been reached, less oxygen is needed and anoxic conditions are prevented. Therefore, at the endpoint, the pH will stabilize and then increase. An increase in pH in the reaction vessel signals the completion of the active digestion period.

Figure 3:
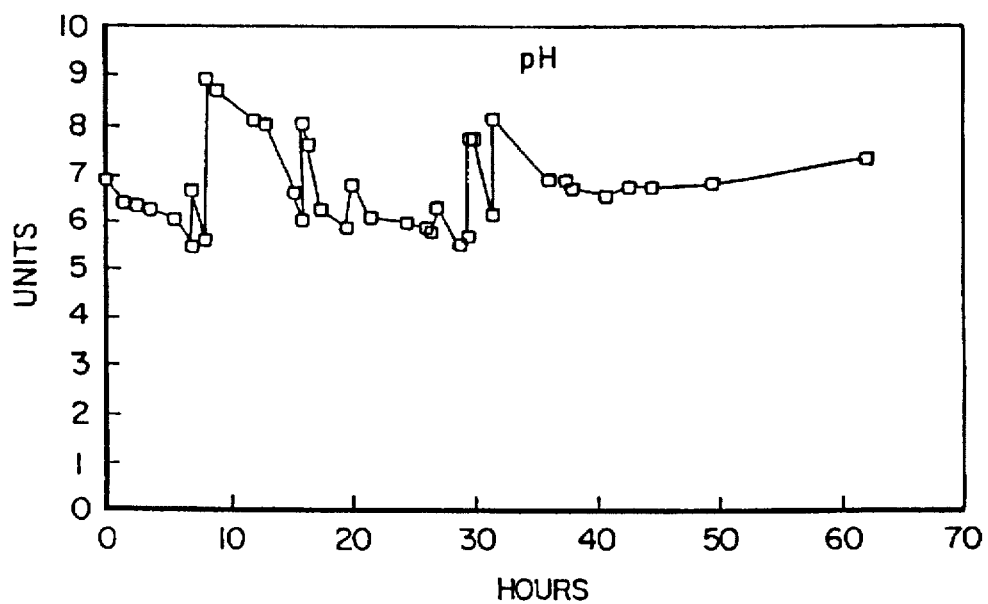

Referring now to FIG. 3, the pH in the reaction vessel was kept above 5.5 through regular additions of lime, resulting in the rapid increases in pH shown in this graph. Approximately 3072 grams of lime were used to correct the pH. Stabilization and rise of pH started at about 38 hours. After the last addition of lime (at 32 hours) the pH dropped slightly and stabilized around 6.5 at 38 hours and increased afterwards to 7.4. This indicates that at 38 hours the first active phase of the process in finished and that bacteria have exhausted the most available food source. Thus, monitoring the increase in the pH can be employed to determine when stabilization has been achieved and the digestion should be terminated.

The Biological Oxygen Demand (BOD) of a liquid indicates the amount of oxygen necessary to mineralize the organic matter in the liquid. It is therefore a measure for the amount of organic matter available for biological breakdown. The BOD of the filtered mixture was 11,700 mg/L at the start and decreased to approximately 10,000 at 38 hours. Longer reaction times decreased the BOD levels even more. No sharp drop is noticeable in the BOD. Therefore it is not a parameter for the determination of the end point.

Dissolved nutrients are an integral part of a slurried vegetable waste. These nutrients will be consumed by microorganisms during digestion/stabilization. To test if nutrient levels could be used to determine the endpoint, filtered samples were analyzed for nitrate, ammonia, phosphate, and sulphate. Samples were screened through a 200 mesh sieve and then filtered through 0.45 μm filter to remove all solids. Analyses took place by electrode (ammonia) or by Ion Exchange Chromatography.

Figure 4:
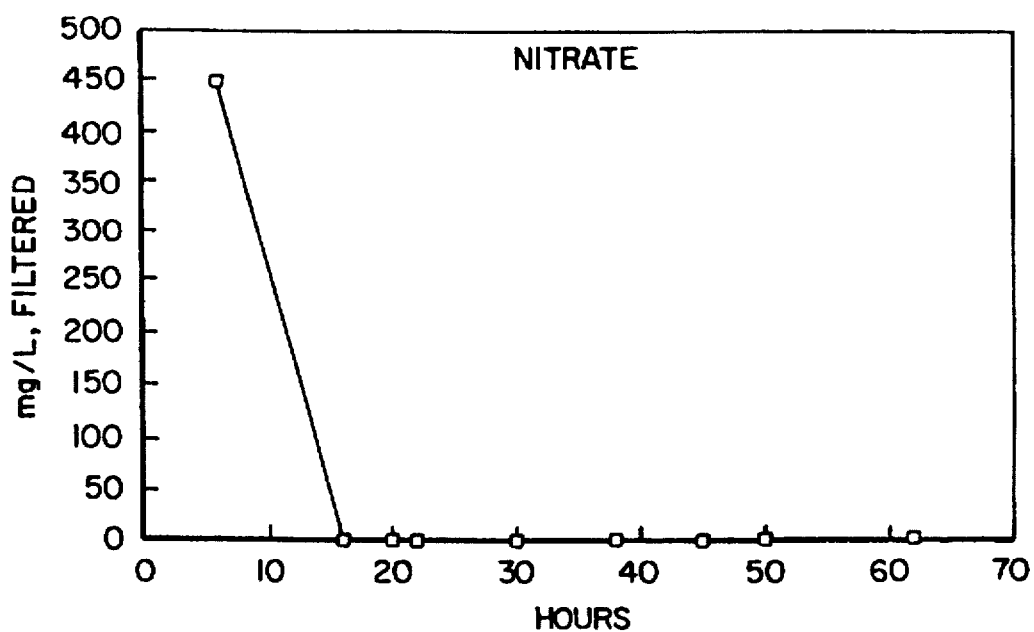

As shown in FIG. 4, nitrate levels at the start were 448 mg/L. Once the active digestion started, the microorganisms adsorbed all "free" nitrate from the mixture. Nitrate levels were not detectable in further samples. Nitrate levels therefore cannot be used to determine the end point.

Figure 5:
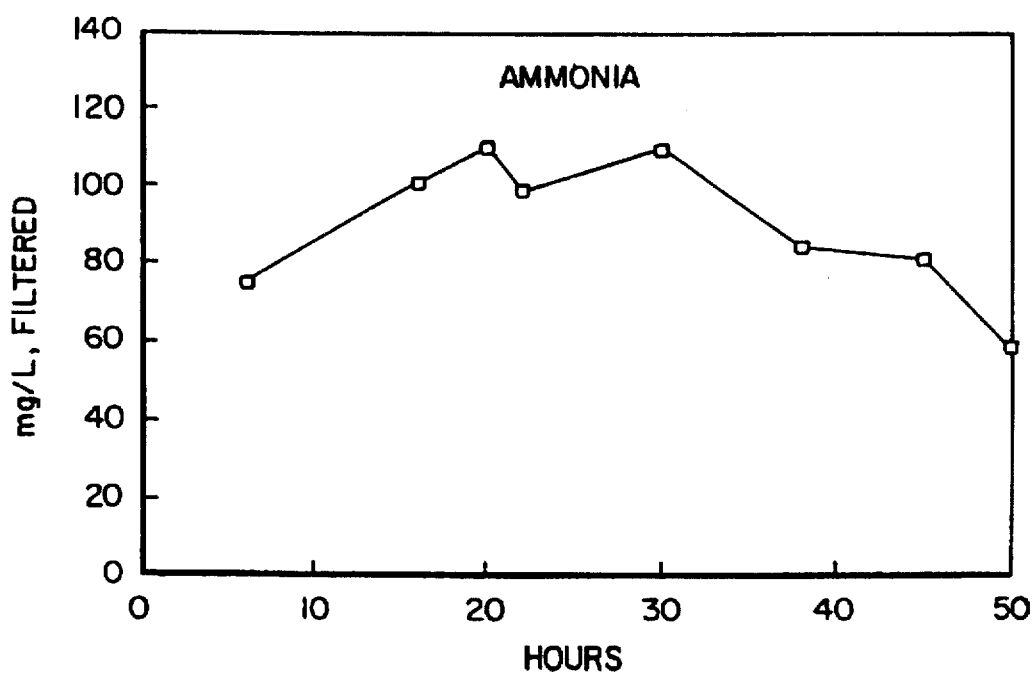

Ammonia, a breakdown product of organic matter, appeared in the mixture at fairly constant level of about 100 mg/L, as shown in FIG. 5. Before the active digestion started and at the end of the digestion (after 38 hours), ammonia levels were decreased to about 80 mg/L. Ammonia levels may support the indication of the end point.

Figure 6:
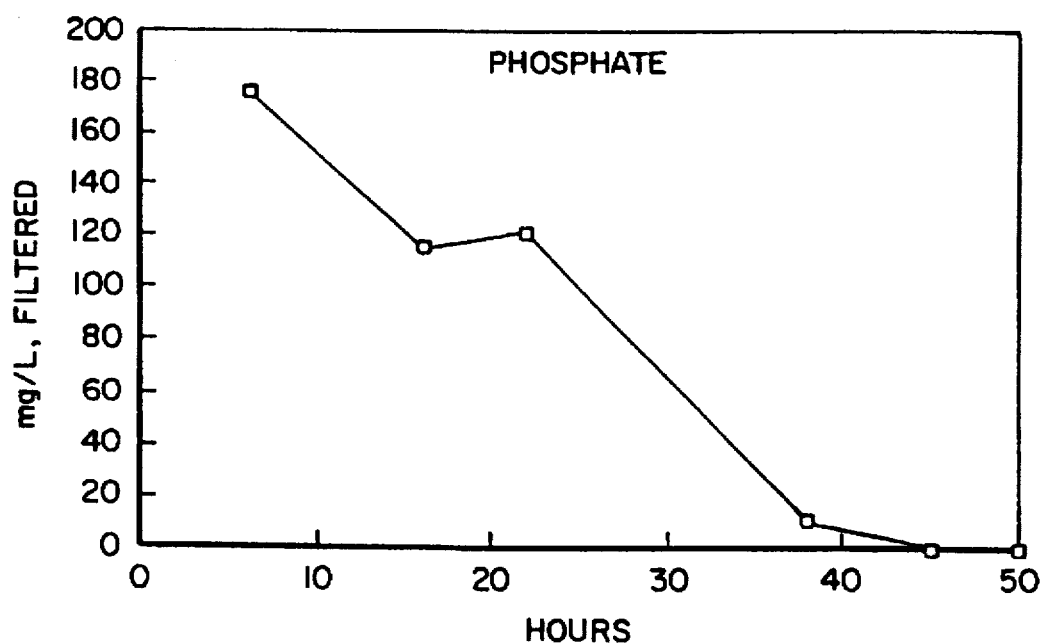

Phosphate, a breakdown product when organic matter is mineralized, appeared in significant levels in the mixture. The levels decreased to non-detectable levels at about 38 hours as shown in FIG. 6. Phosphate is thus a good parameter to be monitored for the determination of the "end point" of the stabilization reaction.

Figure 7:
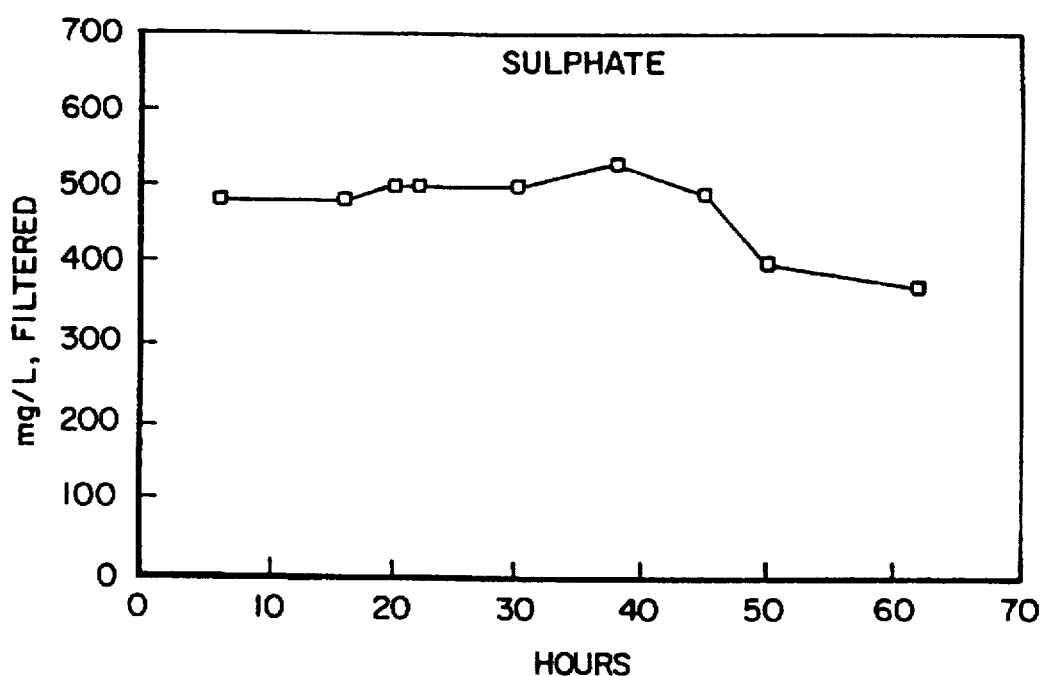

Sulphate was found in the filtered mixture at about 500 mg/L. As shown in FIG. 7, the sulphate concentration peaked at 38 hours and then declined significantly. The peak in the sulphate level can therefore be monitored to indicate the end point.

The final product from the process, mainly undigested but stabilized vegetable matter combined with a large percentage of microbial proteins, is useful as fertilizer or animal feed. It's quality is an important factor in marketing the end product.

To estimate the quality of the end product, samples were taken and dried at different times during the process. Samples were submitted to a laboratory for fertilizer analyses. The "final product" at 38 hours had a nitrogen—phosphorus ($P_2O_5$)—potassium ($K_2O$) rating of 2.5–1.0–3.8 on a dry weight basis.

The Carbon-to-Nitrogen ratio, a measure of how well an organic fertilizer will mineralize and release nutrients into the soil, decreased from 16.9 in raw waste to 14.5 in the product at 38 hours, indicating that mineralization of the product in soils would not affect plant growth through absorption of nitrogen from the soil. After 38 hours the Carbon-to-Nitrogen ratio fluctuated but did not decrease, indicating that nitrogen is being recycled within the mixture. Thus, the stabilization of the mixture can be determined by monitoring the Carbon-to-Nitrogen level to detect termination of a decrease in this level.

The stabilized mixture was collected in drums, dried in a commercial dryer using steam heated elements. Water vapour was condensed and analyzed for $BOD_5$. The BOD analysis showed that no other water treatment was required.

I claim:

1. An aerobic batch process for the conversion of organic solid waste material by liquid thermophilic and solely aerobic digestion, comprising the steps of:

comminuting a batch of the organic solid waste material;

adjusting the moisture content of the comminuted material to at least 90% parts by weight of water;

mixing the comminuted waste material with a thermophilic aerobic micro-organism;

adjusting the pH of the mixture to 5.5–7.5;

supplying heat and oxygen to the mixture to effect thermophilic and solely aerobic digestion of the mixture;

testing the mixture during the aerobic digestion to detect when the mixture has reached a stabilized state in which available organic material and nutrients in the mixture have been consumed by the micro-organisms and in which the micro-organisms have not started to consume lignin or cellulose to any substantial extent;

the testing comprising measuring at least one of the pH level, the phosphate content, the nitrate content, the sulphate content and the carbon-to-nitrogen ratio of the mixture;

terminating the thermophilic and solely aerobic digestion process when the stabilized state is detected; and subsequently drying the mixture.

2. A batch process as claimed in claim 1, in which the step of testing comprises detecting an increase in the pH level of the mixture.

3. A batch process as claimed in claim 1, in which the step of testing comprises detecting a decrease to substantially zero of the phosphate content of the mixture.

4. A batch process as claimed in claim 1, in which the step of monitoring comprises detecting a peak in the sulphate content.

5. A batch process as claimed in claim 1, in which the monitoring step comprises detecting termination of a decrease of the carbon-to-nitrogen ratio.

6. A batch process as claimed in claim 1, which includes adjusting of the carbon-to-nitrogen ratio of the mixture by adding carbon-rich material to the mixture.

7. A batch process as claimed in claim 1, which includes adjusting of the carbon-to-nitrogen ratio of the mixture by adding nitrogen-rich material to the mixture.

8. A batch process as claimed in claim 1, which includes screening the stabilized mixture to remove contaminants.

9. A batch process as claimed in claim 1, in which vapour formed during the liquid thermophilic aerobic digestion and the drying is condensed and discharged without further treatment.

10. A batch process as claimed in claim 1, in which heat produced by the liquid thermophilic aerobic digestion is employed to heat further waste material prior to the digestion of the further waste material.

11. A batch process as claimed in claim 1, in which gases given off by the waste material prior to the liquid thermophilic aerobic digestion are collected and injected into the mixture as the mixture undergoes the liquid thermophilic aerobic digestion.

* * * * *